July 26, 1938.  H. W. JONES  2,125,181
METHOD OF FLAME MACHINING
Filed May 7, 1935  2 Sheets-Sheet 1
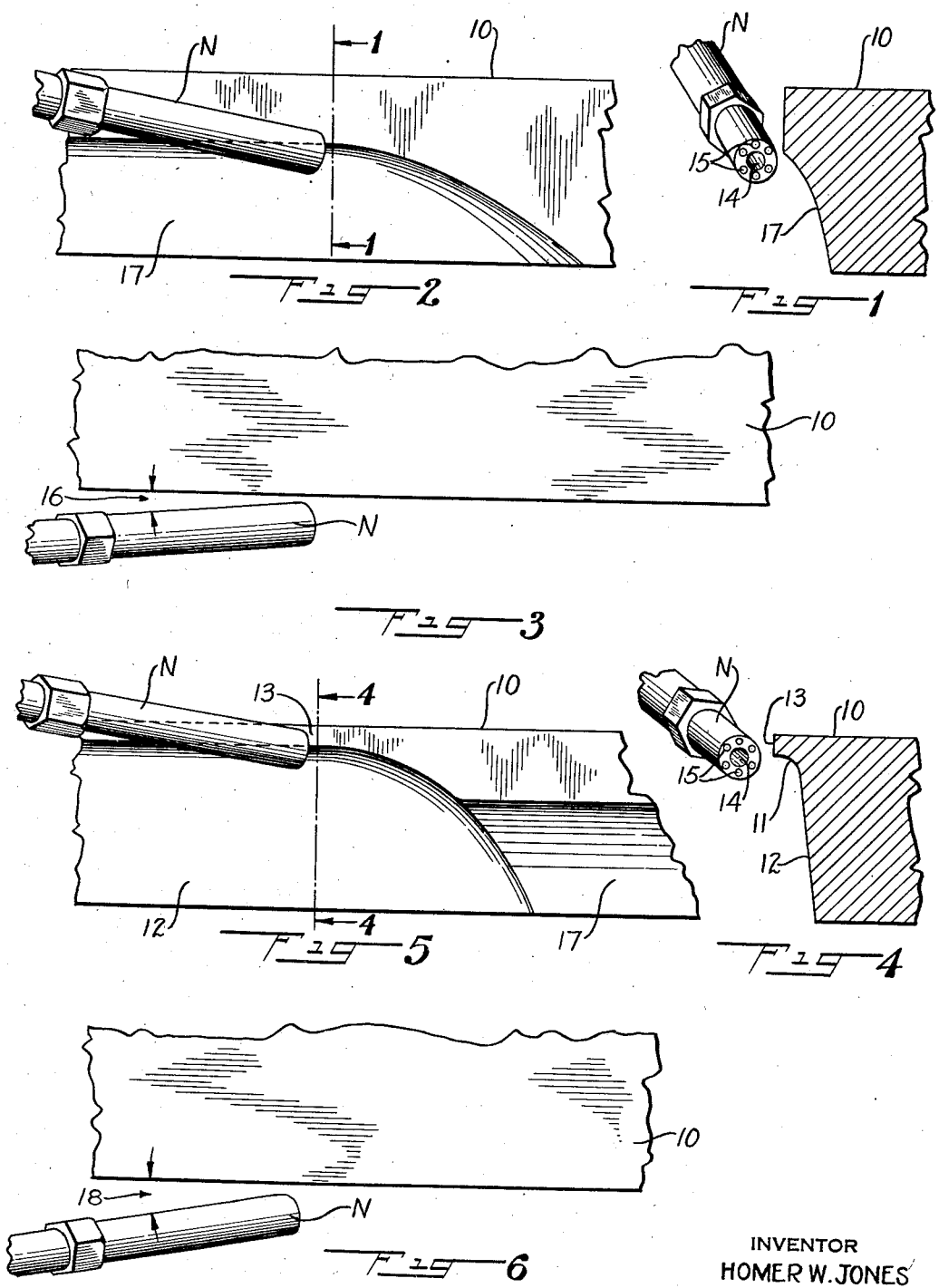
INVENTOR
HOMER W. JONES
BY
ATTORNEY

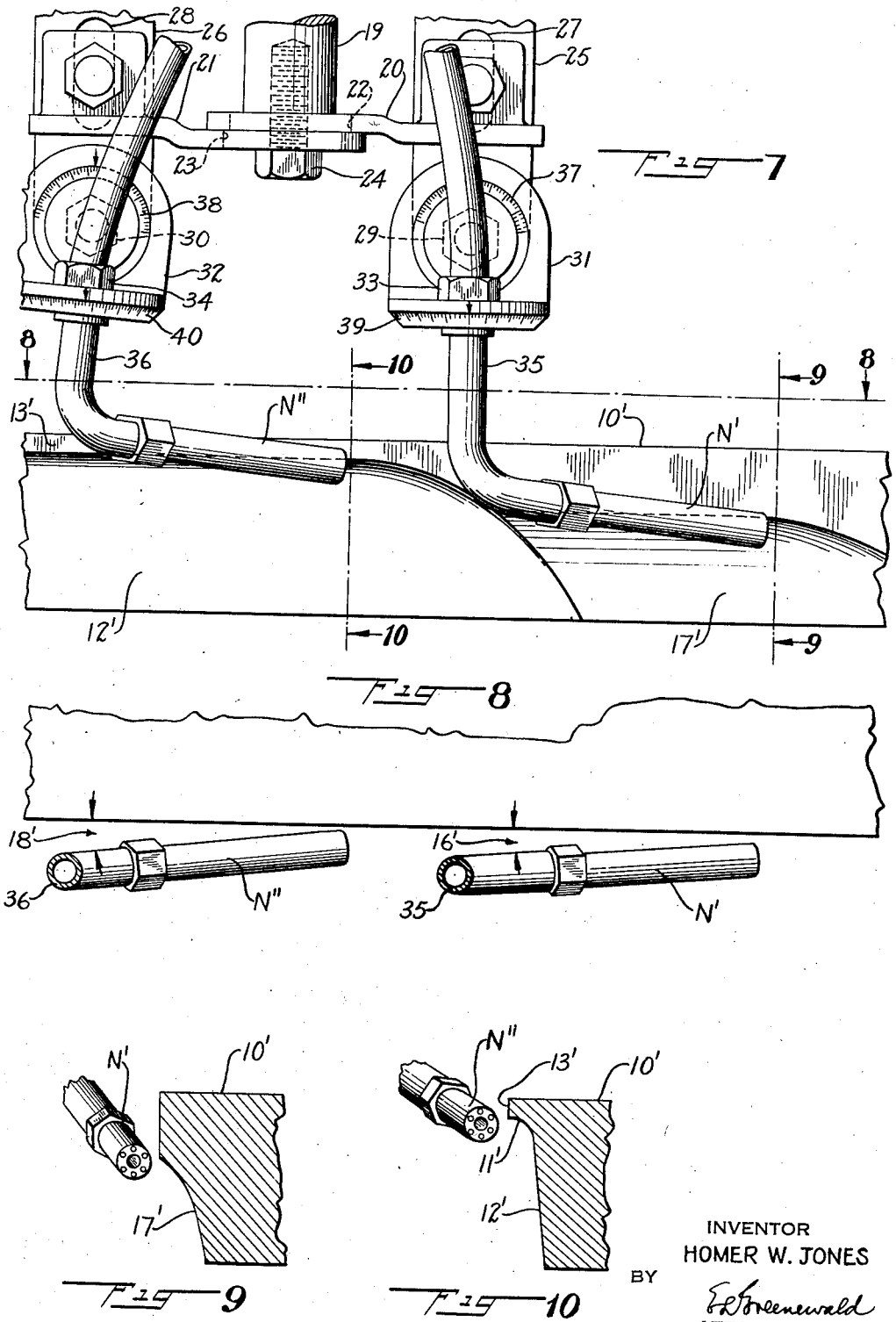

Patented July 26, 1938

2,125,181

UNITED STATES PATENT OFFICE 2,125,181

METHOD OF FLAME MACHINING

Homer W. Jones, Elizabeth, N. J., assignor, by mesne assignments, to Union Carbide and Carbon Corporation, a corporation of New York Application May 7, 1935, Serial No. 20,168

9 Claims. (Cl. 148—9)

This invention relates to a method of flame machining in which heated metal is removed from the surfaces of metallic bodies by progressively applying a plurality of oxidizing gas streams on successive portions of such a surface.

In many instances a predetermined surface contour cannot be produced by applying a single oxidizing gas stream to successive portions of a metallic surface. In accordance with the present method predetermined surface contours are produced by progressively applying an oxidizing gas stream in a definite manner to successive portions of a metallic surface, and thereafter progressively applying another oxidizing gas stream to successive portions of the surface, the last-mentioned gas stream being applied to surface metal previously not acted upon and at least partly to newly exposed surface portions produced by the first-mentioned gas stream and in a manner different therefrom so as to change the surface contour produced by the first-mentioned gas stream.

The present method has been effectively carried out in practice to produce cuts at the edges of plates or other structural shapes which are subsequently united by welding. Such cuts or bevels may take the shape of a half U so that, when two plates having such cuts are arranged with the beveled edges adjacent to each other, a U-shaped groove is provided that is suitable for welding. Although cuts of this general shape can be produced by progressively applying a single oxidizing gas stream to successive surface portions of an edge surface, it has been impossible to control the application of a single oxidizing gas stream to produce any kind of surface contour to meet all the requirements encountered in practice. One such surface contour not capable of being produced by a single oxidizing gas stream, for example, is that which will subsequently provide a U-shaped welding groove having a sharp radius of curvature at the bottom of the groove.

One manner of producing a predetermined surface contour according to the present method will become apparent from the following description, reference being made to the accompanying drawings, in which:

Fig. 1 is a sectional view, taken at line 1—1 of Fig. 2, to illustrate the relative position of a nozzle with respect to the edge of a metallic plate from which metal is removed to produce the preliminary or first cut shown;

Fig. 2 is a side view of the nozzle and plate shown in Fig. 1 to illustrate the downward inclination of the nozzle as it is moved parallel to the edge of the plate;

Fig. 3 is a plan view of the nozzle and plate shown in Fig. 1 to illustrate the application of the oxidizing gas stream at an acute angle to the edge surface of the plate;

Fig. 4 is a sectional view of the plate shown in Fig. 1, taken at line 4—4 of Fig. 5, to illustrate the position of the nozzle with respect to the edge of the plate to produce the final half U-shaped cut shown;

Fig. 5 is a side view of the nozzle and plate shown in Fig. 4, to illustrate the downward inclination of the nozzle during the second or final cut;

Fig. 6 is a plan view of the nozzle and plate shown in Fig. 4, to illustrate that the nozzle is applied at a greater acute angle to the edge surface during the final cut than the first or preliminary cut;

Fig. 7 is a side view of an edge of a metallic plate and the relative position of two nozzles for making the preliminary and final cuts in a single pass of the nozzles;

Fig. 8 is a plan view taken at line 8—8 of Fig. 7 to illustrate more clearly the acute angles of the nozzles with respect to the edge of the plate; and Figs. 9 and 10 are sectional views taken at lines 9—9 and 10—10 of Fig. 7 to show the preliminary and final cuts, respectively, that are produced by the nozzles.

In certain welding applications it is desirable to form shaped edges on metal members which will provide, when two such shaped-edges are aligned for welding a U-shaped welding groove having a sharp radius of curvature at the bottom of the U. A shaped edge of this character is shown in Fig. 4 wherein the portion 11 of the edge surface of a plate 10 has a sharp radius of curvature, and the portion 12 extends downward therefrom in substantially a straight line which is at an angle to the original edge or uncut portion 13.

To produce the shaped edge shown in Fig. 4 by flame machining, it is generally desirable to preheat surface metal to an elevated temperature before the oxidizing gas streams are applied thereto. The entire plate may be heated to an elevated temperature, as in a furnace, or an electric arc or a high temperature heating flame or flames may be utilized to preheat successive portions of the surface metal to an elevated temperature before each oxidizing gas stream is applied to such surface metal. Preferably a single nozzle N is employed to deliver a relatively voluminous oxidizing gas stream and a plurality of high temperature preheating flames. The nozzle N may have a central passage 14 for delivering an oxidizing gas, such as oxygen or a mixture of oxygen and air; and a plurality of passages 15 surrounding the central passage 14 for delivering a combustible gas, such as a mixture of oxygen and acetylene, to produce heating flames to heat the metal to be removed to an elevated temperature. Nozzles of this character are described and claimed in W. S. Walker and W. J. Jacobsson application, Serial No. 536,254, filed May 9, 1931.

The nozzle N may be moved relatively to the edge of the plate 10 in any suitable manner. In order to produce straight cuts a self-propelled carriage (not shown) may be used, such carriage preferably being driven on the top surface of the plate 10 and guided by a rail mounted thereon. An arm may be secured to the carriage which extends beyond the edge of the plate, and on this arm may be mounted a downwardly extending bracket to which the nozzle N can be adjustably secured. Apparatus of this character is described and claimed in J. H. Bucknam and A. J. Miller application, Serial No. 1,470, filed January 12, 1935.

To produce the shaped edge indicated at 11 and 12 in Fig. 4, the nozzle N is positioned at the edge surface of the substantially horizontal plate 10 so that its longitudinal axis is inclined downwardly and also at an acute angle 16 to the surface, as shown in Figs. 1 and 3. As shown in Fig. 2, the relatively voluminous oxidizing gas stream discharged from the tip of the nozzle is applied about a third of the distance from the top face of the plate 10 and has a component of force in the direction of the successive surface portions from which metal is to be removed. The surface metal heated by the heating flames immediately oxidizes when subjected to the influence of the oxidizing gas stream, and surface metal in the form of a slag is blown ahead of and passes over the lower portion of the initial surface to produce the surface contour indicated at 17 in Fig. 2 which slopes inward and downward at a point between the upper and lower faces of the plate 10 and extends to the lower face. This burning or oxidation of surface metal just described takes place progressively as each successive portion of heated surface metal comes in contact with the oxidizing gas stream whereby a layer of metal is removed from the edge surface of the plate 10.

After the initial curved contour indicated at 17 in Fig. 2 is produced, the nozzle N is again moved relatively to the edge surface of the plate 10 to produce the desired surface contour indicated at 11 and 12 in Fig. 4. As shown in Figs. 4 and 6, the nozzle N is again positioned so that its longitudinal axis is inclined downwardly and at an acute angle 18 to the edge surface. In order to produce the sharp radius of curvature indicated at 11, the nozzle N is inclined at a greater acute angle to the surface for the final cut than the preliminary cut described above, the angle 18 being greater than the angle 16. The relatively voluminous oxidizing gas stream discharged from the nozzle N is applied adjacent the uncut portion 13 of the edge surface and produces the curved portion 11 of the cut. The oxidizing gas stream is deflected by the curved portion 11 that it produces, has a component of force in its direction of travel which is different from that of the gas stream producing the initial curved contour, and passes over the newly exposed surface portions indicated at 17. During the final pass of the nozzle N, therefore, not only is a layer of metal previously not acted upon removed adjacent the uncut portion 13 of the edge surface, but a layer of surface metal is also removed from the newly exposed surface portions at the lower part of the edge surface.

By producing the final curved surface contour at the vertical edge of the plate 10 with the oxidizing gas stream slightly inclined downwardly and away from the uncut portion 13 of the edge surface, the surface metal removed is effectively carried away so that the final surface contour produced is smooth and of uniform shape throughout its length.

After each metal removing operation has been started and is in progress, the supply of combustible gas for the preheating flames may be partially or completely shut off in some instances to effect an economy in gas consumption. This is possible because the oxidized metal or slag, which is driven forward and continuously being heated by the heat of reaction resulting from its combustion with oxygen, usually has sufficient heat to preheat surface portions over which it passes and which are subsequenty attacked by the oxidizing gas stream. In many instances, however, it is desirable to apply heating flames during an entire flame machining operation so as to remove a greater amount of surface metal per cubic foot of oxidizing gas.

Although the surface metal removed can be reduced completely to an oxidized form, considerable economy can be effected in the amount of oxidizing gas used by removing a substantial portion of the metal without completely oxidizing it. The metal removed comprising a mixture of oxidized metal and molten metal has been termed a "slag", and such slag, blown ahead of or sideways of a cut as it is being made, is reduced substantially to a non-adherent granular state.

In order to expedite the preparation of plate edges for welding, the initial and final curved surface contours may be produced in a single pass with two nozzles N' and N'' moved relatively to the edge surface of a plate 10', the nozzle N'' being disposed to the rear of the nozzle N', as shown in Fig. 7. The nozzles N' and N'' may be supported adjacent the plate edge in any suitable manner and, as shown, a downwardly extending bracket 19 is provided that may be secured to an arm (not shown) extending beyond the edge of the plate and mounted on a carriage driven on the top surface of the plate 10'. To the lower end of the bracket 19 are secured plates 20 and 21, the latter having elongated openings 22 and 23, through which a threaded stud 24 extends, to adjust the distance between the nozzles N' and N'' in their direction of travel. Vertical arms 25 and 26 are secured to the outer ends of the plates 20 and 21 and provided with elongated openings 27 and 28 at their upper ends for independently adjusting the nozzles N' and N'' vertically with respect to the plate edge.

Pivotally connected at 29 and 30 to the lower ends of arms 25 and 26 are angle members 31 and 32 to which in turn are pivotally connected at 33 and 34 nozzle connectors 35 and 36. The pivotal connections at 29 and 30 permit angular adjustment in a vertical plane and the pivotal connections at 33 and 34 permit angular adjustment in a plane perpendicular to the vertical plane, so that the nozzles N' and N'', which are secured to the connectors 35 and 36, can be adjusted in any desired position. Graduated scales 37 and 38, and 39 and 40 may be provided at the pivotal connections for adjusting the nozzles at predetermined angular positions with respect to the plate edge. Oxidizing gas and combustible gas may be delivered to the connectors 35 and 36 in any suitable manner, as by flexible tubing, for example.

The initial curved sectional contour indicated at 17' in Fig. 9 and the final curved sectional contour indicated at 11' and 12' are made by positioning the nozzles N' and N'' with respect to the plate edge in the same manner that the nozzle N is positioned when the initial and final metal removing operations are effected in several successive passes, as described above. The nozzle N' is positioned about a third of the distance from the top surface of the plate 10' and at an acute angle 16' which is less than the acute angle 18' at which the nozzle N' is positioned adjacent the uncut portion 13' of the plate edge.

By effecting the initial and final metal removing operations simultaneously in a single pass with two nozzles, considerable economy is gas consumption is effected because the second or rear oxidizing gas stream may be arranged to act on the newly exposed surface portions produced by the first gas stream while such portions are at an elevated temperature and in a heated condition. Thus, less preheating gases are necessary for the preheating flames of the second nozzle and the oxidizing gas stream it delivers is more effective and efficient in melting and oxidizing surface metal and causing the removal thereof.

Although I do not wish to be limited thereto, the method of flame machining just described has been successfully carried out in practice with oxidizing gas velocities ranging from 200 to 1,000 feet per second.

The shape of the initial surface contour produced as well as the surface contour of the finished cut are both dependent upon the velocity of the oxidizing gas stream applied, the size of the oxidizing gas stream, and the rate of movement of each gas stream with respect to the surface of a metallic body. Generally the velocity of the gas stream and its rate of movement with respect to the surface are selected to obtain maximum gas economy. By varying the manner and angle at which each gas stream is applied to the surface, predetermined surface contours different from that shown can be produced.

What is claimed is:

1. A method of providing a predetermined curved sectional contour along the edge surface of a metal plate, which comprises supporting said plate in a substantially horizontal position; simultaneously and progressively applying to said edge surface kindling heat and a relatively voluminous oxidizing gas stream, having a velocity between 200 and 1,000 feet per second, so as to remove a layer of surface metal therefrom in the form of slag and produce an initial curved contour which slopes inwardly and downwardly from a point between the upper and lower faces of said plate and extends to such lower face; and subsequently progressively and simultaneously applying to said edge surface kindling heat and a relatively voluminous oxidizing gas stream, having a velocity between 200 and 1,000 feet per second, so as to remove a second layer of surface metal therefrom in the form of slag which flows over the newly exposed surface produced by said first-mentioned gas stream; said gas streams being inclined downwardly and disposed at an acute angle to said edge surface in the direction metal removal is effected; said last-mentioned gas stream being disposed at an acute angle different from that of said first-mentioned gas stream and applied both to surface metal not previously acted upon and to newly exposed surface metal produced by said first-mentioned gas stream, so as to change the initial curved sectional contour and produce the predetermined curved sectional contour which slopes inwardly and downwardly from a point between the upper and lower faces of said plate and extends to such lower face.

2. A method of flame machining in which layers of metal are removed from a substantially vertical edge surface of a metallic body, such layers of metal being removed to provide a curved sectional contour having one edge thereof sloping inwardly and downwardly from an uncut portion of said edge surface and extending to the lower face of said body; which comprises progressively applying a relatively voluminous oxidizing gas stream, having a velocity between 200 and 1,000 feet per second, to heated surface portions spaced from the uncut portion so as to remove a layer of surface metal in the form of slag to produce an initial curved contour; and subsequently progressively applying a relatively voluminous oxidizing gas stream, having a velocity between 200 and 1,000 feet per second, to heated portions of said surface adjacent the uncut portion thereof so as to remove a second layer of surface metal in the form of slag which flows over the newly exposed surface produced by said first-mentioned gas stream; said gas streams being inclined downwardly and disposed at an acute angle to said surface in the direction metal removal is effected said last-mentioned gas stream being applied both to surface metal not previously acted upon and to newly exposed surface metal produced by said first-mentioned stream, so as to change the initial courved contour and produce the desired curved sectional contour which slopes inwardly and downwardly from the uncut portion of said surface and extends to the lower face of said body.

3. A method of preparing a plate or other structural shape for welding by removing metal from an edge surface to produce a curved sectional contour sloping inwardly from an uncut portion of said surface and extending to one face of said plate; which comprises progressively applying a relatively voluminous oxidizing gas stream, having a velocity between 200 and 1000 feet per second, to heated surface portions adjacent the face to which said curved contour extends so as to remove a layer of surface metal therefrom in the form of slag to produce an initial curved contour on said edge; and subsequently progressively applying a relatively voluminous oxidizing gas stream, having a velocity between 200 and 1000 feet per second, to heated portions of said edge surface adjacent the uncut portion thereof so as to remove a second layer of metal in the form of slag from surface metal previously not acted upon by said first-mentioned gas stream; said last-mentioned gas stream being inclined away from the uncut portion of said edge surface so as to be effective to act on the newly exposed surface metal produced by said first-mentioned gas stream to thereby change the initial curved contour and produce the desired curved contour sloping inwardly from the uncut portion of said surface extending to one face of said plate.

4. A method of providing a predetermined curved sectional contour along the edge surface of a metallic body; which comprises supporting said plate in a substantially horizontal position; simultaneously and progressively applying kindling heat and a relatively voluminous oxidizing gas stream, having a velocity between 200 and 1000 feet per second, to said edge surface below the top face of said plate so as to remove a layer of surface metal therefrom in the form of slag to produce an initial curved contour; and subsequently progressively and simultaneously applying kindling heat and an oxidizing gas stream, having a velocity between 200 and 1000 feet per second, to said edge surface below the top face thereof to remove a second layer of surface metal in the form of slag from said edge surface; both of said gas streams being inclined downwardly and disposed at an acute angle to said edge surface in the direction metal removal is effected; said last-mentioned gas stream being applied at a greater acute angle to said edge surface than said first-mentioned gas stream and applied both to surface metal previously not acted upon and to newly exposed surface metal produced by said first-mentioned gas stream so as to change the initial curved contour and produce the desired curved sectional contour which slopes inwardly and downwardly from a point below the top face of said plate and extends to the lower face thereof.

5. A method of removing metal from the edge surface of a body to produce a predetermined curved sectional contour having one edge thereof sloping inwardly from an uncut portion of said surface and extending to a face of said body; which includes the steps of applying a relatively voluminous oxidizing gas stream, having a velocity between 200 and 1000 feet per second, to such surface adjacent the face of said body to which said curved contour extends; relatively moving said gas stream and said surface so as to remove a layer of surface metal therefrom in the form of slag; and, during such relative movement, applying a second relatively voluminous oxidizing gas stream, having a velocity between 200 and 1000 feet per second, to said edge surface adjacent to and inclined away from the uncut portion thereof so as to remove a second layer of metal in the form of slag to produce the sloping edge surface of said predetermined curved surface contour; said last-mentioned gas stream being applied to surface metal not previously acted upon and deflecting over the sloping surface that it produces and flowing over the newly exposed surface metal produced by said first-mentioned gas stream so as to change the initial curved contour and produce the predetermined curved surface contour; said second-mentioned gas stream acting on the newly exposed surface metal while it is in a heated condition as a result of the metal removing effected by said first-mentioned gas stream.

6. A method of removing metal from a substantially vertical edge surface of a metal plate; which comprises the steps of simultaneously and progressively applying to the lower portion of said edge surface kindling heat and a relatively voluminous oxidizing gas stream, having a velocity between 200 and 1000 feet per second, so as to remove a layer of surface metal therefrom in the form of slag and produce an initial curved contour which slopes inwardly and downwardly from a point between the upper and lower faces of said plate and extends to such lower face; and simultaneously and progressively applying to portions of said edge surface above the portions previously acted upon additional kindling heat and a second relatively voluminous oxidizing gas stream, having a velocity between 200 and 1000 feet per second, so as to remove a second layer of surface metal therefrom in the form of slag which flows over the newly exposed surface produced by said first-mentioned gas stream; said gas streams being inclined downwardly and disposed at an acute angle to said edge surface in the direction metal removal is effected, with said last-mentioned gas stream being applied to surface metal previously not acted upon and also to newly exposed surface metal while it is in a heated condition as a result of the metal removing effected by said first-mentioned gas stream; said last-mentioned gas stream being effective to change the initial curved contour and produce the desired curved sectional contour which slopes inwardly and downwardly from a point between the upper and lower faces of said plate and extends to such lower face.

7. A method of shaping an edge surface of a metal plate which comprises simultaneously and progressively applying a plurality of oxidizing gas streams obliquely against heated surface portions of said edge surface, the first of said streams initially removing a layer of metal from said edge surface, and a following stream impinging against another portion of the same surface and also against a part of the surface exposed by the preceding stream.

8. A method of shaping an edge surface of a metal plate which comprises progressively applying a plurality of oxidizing gas streams obliquely against successive portions of said edge surface which have been heated to a kindling temperature; and directing said streams also diagonally relatively to the lateral boundaries of said edge surface, the first of said streams initially removing a layer of metal from said edge surface, and a following stream impinging against another portion of the same surface and also against a substantial part of the surface exposed by the preceding stream.

9. A method of shaping an edge surface of a metal plate which comprises supporting said plate in a substantially horizontal position; simultaneously and progressively applying to said edge surface kindling heat and a plurality of relatively voluminous oxidizing gas streams, said streams being directed obliquely against heated portions of said edge surface and at least one of said streams being applied downwardly across said edge surface; the first of said streams initially removing a layer of metal from said edge surface, and a following stream impinging against another portion of the same surface and also against a substantial part of the surface exposed by the preceding stream so as to change the initial surface contour produced by said first gas stream and provide the desired cross-sectional contour of said edge.

HOMER W. JONES.